March 30, 1943.  C. B. GREENBERG  2,315,417
EXPANSION LINK
Filed April 14, 1941
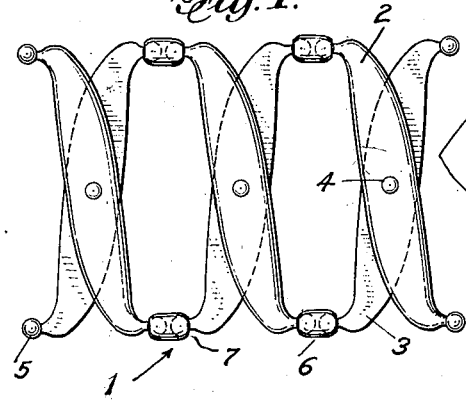
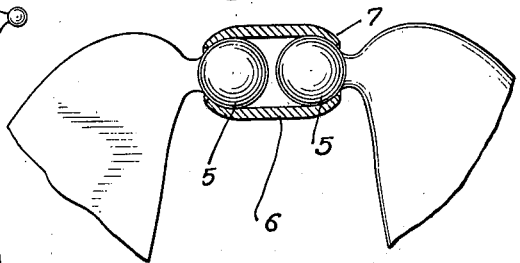
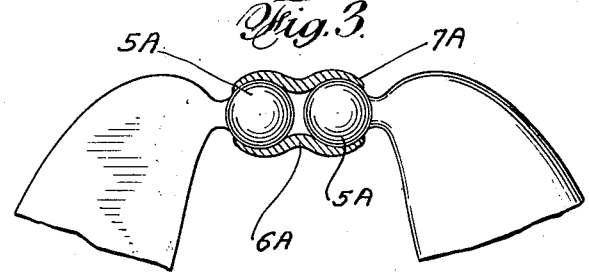
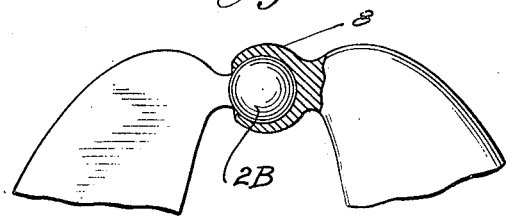
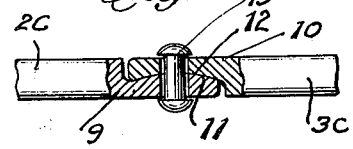
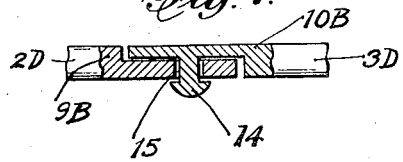
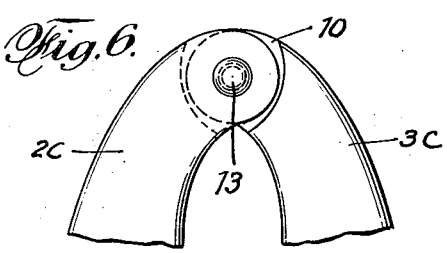
INVENTOR
CHARLES B. GREENBERG
BY William Wolfe
ATTORNEY Patented Mar. 30, 1943

2,315,417

UNITED STATES PATENT OFFICE 2,315,417

EXPANSION LINK

Charles B. Greenberg, New York, N. Y.

Application April 14, 1941, Serial No. 388,413

2 Claims. (Cl. 59—79)

My invention relates to link chains for bracelets and bands for wrist watch straps, and in more detail to a construction for joining the ends of the pantograph arms which form the links of the bracelet.

This invention is an improvement on my Patent #2,236,820 and describes variations in the elements for joining the link arms together. The object of my invention is to construct a simple, flexible pantograph linkage capable of great expansion, and a flexible in a direction at an angle to the plane of the linkage. Another object is to design a linkage which can be easily constructed on screw machines with a minimum of operations and results in a simple and attractive article of jewelry.

I accomplish these objects by terminating the ends of the link arms in ball shapes and holding the adjacent arm ends in close contact in a sheath. Other means of accomplishing the same object are shown in variations, such as in Fig. 4 of the drawing in which the link arms are movably held together by terminating one arm in a ball and the other in an enclosing socket holding the ball movable. A third variation is shown in Fig. 5 in which the link arms are held together by a pin extending transversely to the plane of the arms through reduced adjacent ends of the arms, and to impart flexibility to this structure, corresponding faces of the reduced parts are convex and concave shaped. A variation of the structure shown in Fig. 5 is shown in Fig. 7 in which one of the reduced arm ends is provided with an extension used to replace the pin shown in Fig. 5. Further and more specific details and objects of my invention will be shown and described in the accompanying drawing in which:

Fig. 1 is a plan view of the linkage;

Fig. 2 is a fragmentary enlarged detail, partly in section;

Fig. 3 is a fragmentary enlarged detail, partly in section, showing a variation of my invention;

Fig. 4 is a fragmentary enlarged detail, partly in section, showing a second variation of the invention;

Fig. 5 is a fragmentary enlarged detail, partly in section, showing a third variation;

Fig. 6 is a plan view of the variation shown in Fig. 5; and

Fig. 7 is a fragmentary enlarged view, partly in section, showing a fourth variation.

In the drawing, the chain 1 showing my invention is comprised of the upper and lower link arm elements 2 and 3 respectively. The links are joined together by means of the pin extension 4 positioned at the center of the link arms. Any other suitable means may be used to hold the link arms together, and to retain the arms in a closed position and provide the necessary pantograph action.

As shown in Fig. 1, all the link arms terminate in ball ends 5. Corresponding arms are joined together by sheaths or tubes 6 encasing the balls and holding them in position by means of the spun over or bent inward ends 7 of the sheaths.

Fig. 3 shows a variation in the shape of the sheath or tube 6A holding the balls 5A. The tube, in this case, is double ovate-shaped at 7A to provide close contact with the balls and hold them intimately, yet loosely. In order to permit rotation and movement, the ends of the sheath 7A are decreased in thickness and terminate a short distance away from the arm. In the variation shown in Fig. 4, one arm terminates in a ball 2B and the other in a ball socket 8. In this case, too, the end of the socket 8 terminates a short distance from the arm and its material is lessened in order to provide flexibility. In the variation shown in Figs. 5 and 6, the arms 2C and 3C terminate in decreased reduced shoulder elements 9 and 10. The decreased parts 9 and 10 overlap and their adjacent faces are correspondingly convex and concave shaped as at 11 and 12. The pin 13 rests loosely in the holes through the center of the curved faces and holds the arms in close contact, but permits a flexibility of movement. The ends of the pin are enlarged to prevent the escape of the arms. In the variations shown in Fig. 7, the arms 2D and 3D are provided with reduced end parts 9B and 10B resting opposite each other. The part 10B is provided at the center of the reduced part with the extension 14 and the part 9B with the hole 15 through which the part 14 extends. The end of this extension is enlarged or braised over, holding the two arms in intimate but movable contact.

In order to impart flexibility in a direction other than in a plane of the links, the curved surfaces 14 and 15 are provided in Fig. 5 and the pin holds the arms loosely, while in Fig. 7 a like flexibility is imparted by enlarging the hole 15 and by holding the arms in loose contact. In the other variations, the ball and socket structure permits ample flexibility.

As the details described in the drawing show only a few forms of my invention and since many changes and modifications may be made in the same invention without changing or departing from the spirit and scope of the basic idea, I desire to cover all modifications, forms and embodiments coming within the language of any one or more of the appended claims.

I claim:

1. An expansible link chain for bracelets and the like comprising pairs of rigid link arms, means pivoting each pair of said link arms between their ends, a coupling means for holding corresponding link arm ends in intimate movable contact, comprising ball elements on the arm ends and a sheath having narrowed end sections suitable for encasing and holding the balls in intimate movable association and cooperating to permit free motion of the arms about the pivots.

2. An expansible link chain for bracelets and the like comprising pairs of rigid link arms, means pivoting each pair of said link arms between their ends, a coupling means for holding corresponding link arm ends in intimate movable contact, comprising ball elements on the arm ends and a sheath having ovate-shaped end sections suitable for encasing and holding the balls in intimate movable association and cooperating to permit free motion of the arms about the pivots.

CHARLES B. GREENBERG.